United States Patent Office 3,461,744
Patented Aug. 19, 1969

3,461,744
STEERING OF TRACKED VEHICLES
Stanley Henshaw Booth, Wokingham, England, assignor to The Secretary of State for Defence in Her Britannic Majesty's Government of the United Kingdom of Great Britain and Northern Ireland, London, England
Filed Oct. 31, 1966, Ser. No. 590,651
Claims priority, application Great Britain, Nov. 4, 1965, 46,751/65
Int. Cl. F16h 47/04; B62d 5/10, 11/00
U.S. Cl. 74—720.5                                    6 Claims

ABSTRACT OF THE DISCLOSURE

A steering system for a track laying vehicle comprises differential gearing for driving the tracks. A closed hydraulic system includes two motor/pumps connected to gearing from the differential to opposite tracks and means interconnecting the motor/pumps whereby the output of one motor/pump may be selectively increased as that of the other is decreased. Braking means for each track include spring loaded valves hydraulically connected to the outlets of the motor/pumps and to brakes for selective braking of the tracks to steer the vehicles.

---

The invention relates to the steering of tracked or wheeled vehicles which are steered by changing the speed of the tracks or wheels on one side of the vehicle relative to the track or wheels on the other side of the vehicle. Previously this speed variation has been achieved by the use of clutches, brakes or hydraulic motors.

When clutches or brakes are used, power loss occurs during the slipping phase, and because the gearing has to be chosen to give an acceptably small turning circle with the brakes fully engaged, this results in the slipping phase occurring for all turns of radius larger than the minimum. Also, because of the existence of this brake slipping phase during a large part of the vehivle operating life the size of the friction elements needs to be appropriate to the thermal loading involved.

When hydraulic means are used to control the speed differences, the size of the hydraulic motors is determined by the minimum radius of turn required at a given speed. This calls for the use of large motors, as necessitated by the minimum turn radius requirement, running for a considerable period of operation well below their rated capacity with consequential lower efficiency during periods of vehicle operation from the minimum turn radius up to straight running.

There is a need, therefore, for a steering system for tracked vehicles which is efficient at large turning radii, is capable of giving a small radius of turn is required and gives a smoothness and degree of stable control such as is normally provided by hydraulic motors alone.

According to this invention a power transmission system for driving and steering vehicles comprises a differential gearing for driving tracks or sets of wheels on both sides of a vehicle, a closed circuit hydraulic system including two motor/pumps which respectively are connected to the gearing from the differential to opposite tracks or sets of wheels and means interconnecting the motor/pumps and coupled to the steering mechanism of the vehicle whereby the output of one motor/pump is increased as that of the other is decreased, braking means being also associated with each track or set of wheels. Such braking means may include two spring loaded valves hydraulically connected to the outlets of the motor/pumps and to brakes on both sides of the vehicle which are capable of selectively braking the track or wheels to steer the vehicle.

Figure 1:
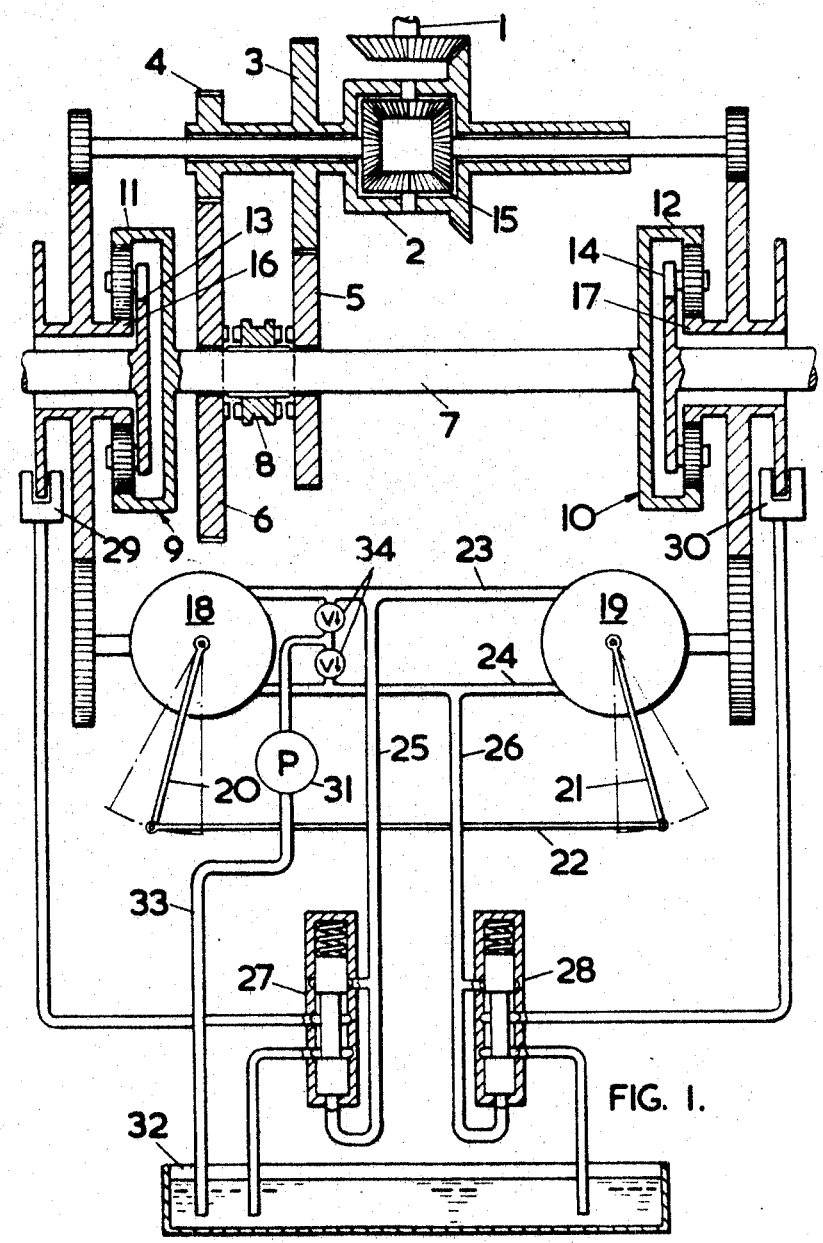
Figure 2:
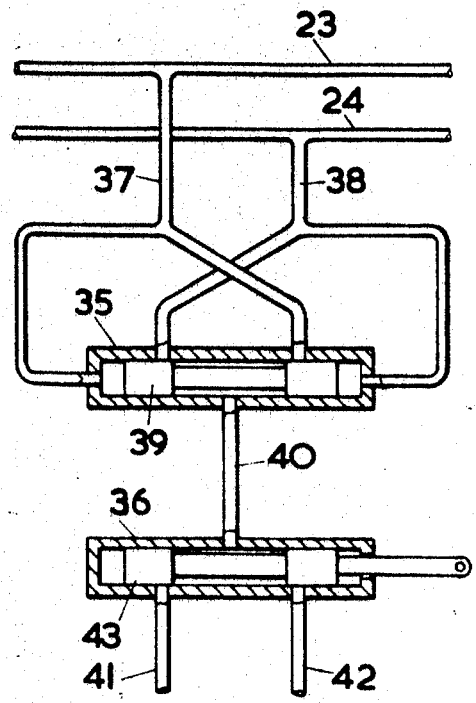
Figure 3:
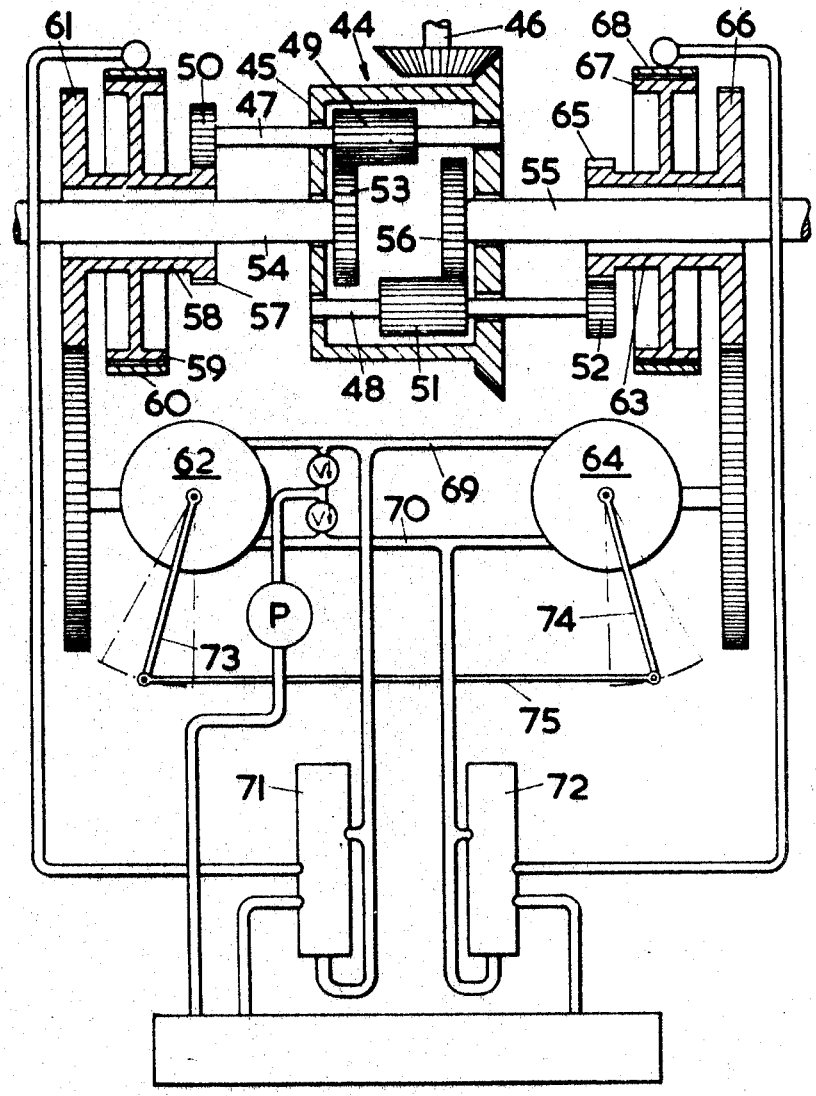

The invention will now be described, by way of example only, in the accompanying drawings of which:

FIGURE 1 is a diagrammatic view of one form of driving and steering mechanism according to this invention, FIGURE 2 is a diagrammatic view of two valves to be used with the mechanism of FIGURE 1, FIGURE 3 is a diagrammatic view of an alternative form of the invention.

FIGURE 1 shows one form of driving and steering mechanism, for mounting in a tracked vehicle, comprising an input shaft 1, connected to the vehicle's engine, driving a differential casing 2 which carries two gear wheels 3, 4 fixed thereto to drive engaging gear wheels 5, 6 rotatably mounted on a main driving shaft 7 located transversely in the vehicle. A sliding member 8 connects either of the gear wheels 5, 6, to the main driving shaft 7 thus providing alternative gear ratios between the differential casing 2 and the main driving shaft 7. Although only a two gear ratio is shown any suitable multi ratio gearing may be used. Located on each side of the vehicle is an epicyclic gearing 9, 10 and the ends of the main driving shaft 7 are respectively connected to the annular gears 11, 12 of such epicyclic gearings 9, 10. The planet carriers 13, 14 of these epicyclic gearings 9, 10 drive the track (not shown) on the left and right hand side of the vehicle respectively. Drive is also taken from the input shaft 1 through a differential gearing 15 to the sun wheels 16, 17 of both left and right hand epicyclic gearings 9, 10. Two similar variable displacement hydraulic motor/pumps, namely a left and a right hand motor/pump 18, 19, are arranged in the vehicle and are gearably connected to the sun wheel 16, 17 in the left and right hand epicyclic gearing 9, 10 respectively. The displacement controls 20, 21 of the motor/pumps 18, 19 are connected together by steering linkage 22 so that when either motor/pump is at its maximum displacement the other is at its minimum displacement, also the displacements can be made substantially equal so that both motor/pumps 18, 19 rotate at equal speed. Pipes 23, 24 are connected between the inlet and outlet of the motor/pumps 18, 19 to form a closed hydraulic circuit. The interconnecting pipes 23, 24 are connected through pipes 25, 26 to spring loaded regulating valves 27, 28 set to open at a predetermined pressure to allow fluid under pressure to pass through and actuate brakes such as disc brakes 29, 30 connected to the sun wheels 16, 17 of the epicyclic gearings 9, 10. The interconnecting pipes 23, 24 between the motor/pumps are thus hydraulically connected to a disc brake 29,30 at the left and right hand side of the vehicle respectively. An auxiliary pump 31 and pressure relief valve (not shown) connected to a fluid reservoir 32 through a pipe 33 acts through two non-return valves 34 to maintain the volume of fluid and the minimum pressure in the motor/pumps circuit at a suitable level.

Operation of the vehicle for straight ahead steering is as follows: drive is transmitted from the vehicle engine to the input shaft 1. This input shaft 1 drives the main driving shaft 7 and the annular gears 11, 12 of the epicyclic gears 9, 10 at both sides of the vehicle and also drives the sun wheels 16, 17 of the said epicyclic gears 9, 10 through the differential gearing 15 so that the planet carriers 13, 14 of the said epicyclic gears 9, 10 are rotated. Thus both tracks are rotated. To maintain straight ahead running the hydraulic motor/pumps 18, 19 are both maintained at substantially equal displacements by suitable positioning of the steering linkage 22 so that both motor/pumps 18, 19 rotate at equal speeds and because of the geared connections between the motor/pumps 18, 19 and the sun wheels 16, 17, both planet carriers 13, 14 and therefore the track on both sides of the vehicle rotate at equal speeds.

To steer the vehicle to the left when moving forward the steering linkage 22 is moved an appropriate amount. This decreases the displacement of the motor/pump 19 connected to the right hand epicyclic gearing 10 and increases the displacement of the motor/pump 18 connected to the left hand epicyclic gearing 9. Since there is a closed fluid circuit between the two motor/pumps 18, 19 the right hand motor/pump 19 speeds up whilst the left hand motor/pump 18 slows down, the left hand motor/pump 18 driving the right hand motor/pump 19 and causing a pressure rise in the connecting pipe 23. This speed variation between the motor/pumps 18, 19 slows the sun wheel 16 of the left hand epicyclic 9 and increases the rate of rotation of the sun wheel 17 of the right hand epicyclic gear 10; the speed variation between the sun wheels 16, 17 being allowed by the differential gearing drive 15 to both sun wheels 16, 17. The output drive from the left hand epicyclic 9 to the left hand track is thus slower than the output drive from the right hand epicyclic 10 to the right hand track and the vehicle is steered to the left. Providing the pressure rise in the connecting pipe 23 does not exceed a predetermined value the turn radius will be dependent upon the various ratios of gearing and the relative displacements of the two motor/pumps 18, 19.

For small radius turns when the torque required to vary the relative speed of the sun wheels 16, 17 exceeds the capacity of the motor/pumps 18, 19 the brakes 29, 30 supplement the motor/pumps 18, 19 to steer the vehicle. To steer the vehicle into a small radius left hand turn when moving forwards the steering linkage 22 is moved an appropriate amount to decrease the displacement of the right hand motor/pump 19 whilst increasing the displacement of the left hand motor/pump 18 which speeds up the right hand motor/pump 19 and slows down the left hand motor/pump 18. As a consequence pressure rises in the connecting pipe 23 between the two motor/pumps 18, 19 and opens the left hand regulating valve 27 to allow fluid pressure to pass therethrough and actuate the left hand brake 29 thus supplementing the retarding torque exerted by the left hand motor/pump 18 on the left hand sun wheel 16; the retardation exerted by the left hand brake 29 relieves the load on the left hand motor/pump 18 thereby reducing the pressure in the connecting pipe 23 and allowing the left hand regulating valve 27 to close until the pressure in the connecting pipe 23 rises sufficiently to cause it to open again. Thus the left hand regulating valve 27 moves between its fully open and fully closed position to actuate the left hand brake 29 and maintain the pressure in the connecting pipe 23 substantially at the predetermined level.

Steering of the vehicle to the right is exactly the opposite of steering to the left as herein before described.

The vehicle may also be turned when stationary when there is no drive to the main driving shaft 7. In this case one sun wheel 16 or 17 is rotated through the differential gearing 15 whilst the other sun wheel 17 or 16 is braked by its associated brake 30 or 29 under the control of the pressure in the connecting pipes 23, 24 between the two motor/pumps 18, 19.

In some applications when the vehicle is moving rearwardly the fluid flow in the connecting pipes 23, 24 is reversed because of the reverse rotation of the motor/pumps 18, 19. To enable the brakes 29, 30 to be applied to the slower rotating sun wheel when the vehicle is turning under the control of the two motor/pumps 18, 19 the connections between the connecting pipes 23, 24 and the left and right hand regulating valves 27, 28 must be reversed. Two valves 35, 36 may be used to do this as shown in FIGURE 2.

The valve 35 is connected to both the connecting pipes 23, 24 between the motor/pumps 18, 19 by pipes 37, 38 so that increased pressure in either of the said connecting pipes 23, 24 moves a valve spool 39 to allow the increased pressure to pass there-through into a single outlet pipe 40. From this outlet pipe 40 fluid may pass to the second valve 36 which has two outlet pipes 41, 42, leading to the left hand valve 27 and to the right hand valve 28 respectively. Movement of the steering linkage 22 moves a valve spool 43 of this second valve 36 through linkage (not shown) to allow fluid to pass there-through to the desired brake 29 or 30 irrespective of which direction the vehicle is travelling in.

In the alternative form of the invention shown in FIGURE 3 the drive is taken from a vehicle's gearbox (not shown) to a differential 44. This differential 44 consists of a casing 45 rotatably driven through gearing by an input shaft 46. Mounted in bearings carried by this casing are six shafts 47, 48 (two only shown) arranged with their axes parallel to the axis of rotation of the casing 45.

Each shaft 47, 48 has formed thereon two gear wheels 49, 50, 51, 52, respectively, one 49, 51 located inside the casing 45 and one 50, 52 outside the casing 45. Three of the shafts 47 are connected, through the gear wheel 49 inside the casing 45 and a gear wheel 53, to a left hand half shaft 54 which drives the track (not shown) on the left hand side of the vehicle. Similarly the remaining three shafts 48 in the differential casing 45 drive a right hand half shaft 55 and right hand tracks through gear wheels 51 and 56. The three shafts 47 driving the left hand half shaft 54 also drive, by means of the gear wheels 50 outside the casing 45, a gear wheel 57 fixed to a left hand tubular shaft 58 arranged concentric with and surrounding a part of the left hand half shaft 54. This left hand tubular shaft 58 carries a braking surface 59 upon which a brake 60 may act, and a second gear wheel 61 which drives a left hand variable displacement hydraulic motor/pump 62. A right hand tubular shaft 63 and a variable displacement hydraulic motor/pump 64 are similarly constructed and driven from the differential through gear wheels 52, 65, 66, the tubular shaft 63 being provided with a brake surface 67 operated on by a brake 68. Both motor/pumps 62, 64 are hydraulically connected together by pipes 69, 70 and through valves 71, 72 to the brakes 60, 68 and have their displacement controls 73, 74 linked together by a steering linkage 75 and to the vehicles steering controls as in the first form of the invention hereinbefore described with reference to FIGURE 1, the valves 71, 72 being similar in construction and function to the valves 27, 28 of FIGURE 1.

Steering of the vehicle to the left when moving ahead is achieved by suitable movement of the steering linkage 75 to decrease the displacement of the right hand motor/pump 64 and increase the displacement of the left hand motor/pump 62. As a result the right hand motor/pump 64 increases its speed, thereby increasing the speed of the right hand tubular shaft 63 and half shaft 55, whilst the left hand motor/pump 62 decreases its speed thereby slowing the speed of the left hand tubular shaft 58 and half shaft 54. For smaller radius turns further movement of the steering linkage 75 causes, as before, an increase of pressure, above a pre-set limit, in the connecting pipe 69 between the motor/pumps 62, 64 to actuate the left hand brake 60 thereby supplementing the torque exerted on the tubular shaft 58 by the left hand motor/pump 62.

Steering the vehicle to the right is exactly opposite to steering to the left. Straight ahead travel is achieved by maintaining the speeds of both motor/pumps 62, 64 equal.

If the vehicle is capable of rearward movement then to steer it a change over of connections from the connecting pipes 69, 70 between the motor/pumps 62, 64 to the brakes 60, 68 must be made. This may be done by two valves in a manner identical to that in the first form of the invention and as shown in FIGURE 2.

It should be understood that the invention is also applicable to wheeled vehicles which are steered by varying the speed between the wheels on either side of the vehicle.

I claim:

1. A power transmission system for driving and steering a vehicle having tracks on both sides of the vehicle and a steering mechanism comprising: a power input member; gearing including a differential gear for transmitting driving power from the input member to the tracks on opposite sides of the vehicle; a closed circuit hydraulic system including two variable displacement motor/pumps which respectively are connected to and driven by the gearing driving the opposite tracks, and means interconnecting the motor/pumps and coupled to the steering mechanism whereby the output on one motor/pump may be increased as that of the other is decreased; and hydraulic braking means associated with each track for retarding the speed thereof, said braking means being connected to, and operable in response to changes in the hydraulic pressure in, the closed circuit hydraulic system.

2. A power transmission system according to claim 1 wherein the closed circuit hydraulic system comprises displacement controls for the two motor/pumps so connected together that the displacement of one motor/pump may be increased as that of the other is decreased; pipes connecting each motor/pump inlet to the outlet of the other motor/pump; and two regulating valves each connected to one of the interconnecting pipes between the motor/pumps and to one of the braking means so that when the hydraulic pressure in one of the interconnecting pipes rises above a preset value, due to movement of the motor/pump displacement controls to cause the speed of one motor/pump to reduce as that of the other is increased, hydraulic pressure passes through one of the regulating valves to apply the braking means on the appropriate side of the vehicle to supplement the retardation exerted by the slower moving motor/pump on its associated track.

3. A power transmission system according to claim 2 wherein the gearing further comprises two three-element epicyclic gearings associated respectively with the drives to the tracks on opposite sides of the vehicle a first element in each epicyclic gearing being connected to one track and a second element being connected to one element of the differential gear, and a multispeed gearing connecting the third element in each epicyclic gearing to another element of the differential gear.

4. A power transmission system according to claim 3 wherein the first element in each epicyclic gearing is a planet carrier, the second element is a sun wheel, and the third element is an annular gear.

5. A power transmission system according to claim 2 wherein the closed circuit hydraulic system further comprises valve means interposed between the interconnecting pipes and the regulating valves to ensure that hydraulic pressure is directed to the appropriate regulating valve despite reversals of fluid flow in the motor/pumps due to forward and reverse movement of the vehicle.

6. A power transmission system for driving and steering a vehicle having sets of wheels on both sides of the vehicle and a steering mechanism comprising: a power input member; gearing including a differential gear for transmitting driving power from the input member to the sets of wheels on opposite sides of the vehicle; a closed circuit hydraulic system including two variable displacement motor/pumps which respectively are connected to and driven by the gearing driving the opposite sets of wheels, and means interconnecting the motor/pumps and coupled to the steering mechanism whereby the speed of one motor/pump may be increased as that of the other is decreased so that the speed of the set of wheels on one side of the vehicle is increased as that of the set on the other side is decreased; hydraulically actuated brakes associated with each set of wheels and with the gearing between the differential gear and the motor/pumps; and means responsive to changes in the hydraulic pressure in the closed circuit hydraulic system for supplying hydraulic pressure from said system to so actuate the brakes as to supplement the motor/pumps in decreasing the speed of one set of wheels relative to that of the other set of wheels.

References Cited

UNITED STATES PATENTS

| | | | |
|---|---|---|---|
| 2,336,912 | 12/1943 | Zimmermann | 74—720.5 X |
| 2,377,354 | 6/1945 | Merritt | 74—720.5 X |
| 2,918,830 | 12/1959 | O'Leary | 74—710.5 |
| 3,044,320 | 7/1962 | Oudry | 74—710.5 |
| 3,081,647 | 3/1963 | Blenkle | 74—710.5 |
| 3,199,376 | 8/1965 | De Lalio | 74—720.5 |
| 3,365,013 | 1/1968 | Lundin et al. | 180—6.44 |
| 3,371,734 | 3/1968 | Zaunberger et al | 180—6.44 |
| 3,383,952 | 5/1968 | Christenson | 74—720.5 |

LEONARD H. GERIN, Primary Examiner

U.S. Cl. X.R.

74—687; 180—6.3, 6.44, 6.7